(12) United States Patent
Jefferson et al.

(10) Patent No.: US 7,523,986 B2
(45) Date of Patent: Apr. 28, 2009

(54) CHILD CARRIER ATTACHMENTS FOR BICYCLES

(75) Inventors: Malcolm Jefferson, Ottawa (CA); Brian Barnwell, Stittsville (CA); Terence Norman Back, Whitby (CA); Josephine Back, legal representative, Whitby (CA)

(73) Assignee: 2083461 Ontario Inc., Ottawa (CA)

( * ) Notice: Subject to any disclaimer, the term of this patent is extended or adjusted under 35 U.S.C. 154(b) by 884 days.

(21) Appl. No.: 09/804,070

(22) Filed: Mar. 13, 2001

(65) Prior Publication Data

US 2004/0061361 A1 Apr. 1, 2004

(30) Foreign Application Priority Data

Mar. 14, 2000 (CA) .................................... 2300598

(51) Int. Cl.
*B60J 1/00* (2006.01)
(52) U.S. Cl. .................................. 297/195.13; 297/243
(58) Field of Classification Search ............ 297/195.13, 297/243; 280/202, 220, 288.4, 304.4, 304.5; 16/2.1
See application file for complete search history.

(56) References Cited

U.S. PATENT DOCUMENTS

| 453,212 | A | * | 6/1891 | Sager ........................ 297/129 |
| 460,031 | A | * | 9/1891 | Rastetter et al. ............. 297/243 |
| 3,515,431 | A | | 6/1970 | Grady |
| 3,738,704 | A | | 6/1973 | Smith et al. |
| 3,902,737 | A | * | 9/1975 | Berger et al. ................. 280/202 |
| 4,305,532 | A | * | 12/1981 | Reminger .................... 224/416 |
| 4,632,453 | A | | 12/1986 | Robbin et al. |
| D291,506 | S | | 8/1987 | Shields |
| 4,919,479 | A | | 4/1990 | Loewke et al. |
| 4,964,551 | A | | 10/1990 | O'Donovan et al. |
| 4,969,658 | A | | 11/1990 | Levarek et al. |
| 5,104,188 | A | | 4/1992 | Jefferson |
| 5,149,112 | A | * | 9/1992 | Nauman et al. ............. 280/7.11 |
| 5,330,215 | A | * | 7/1994 | Bishaf et al. ................. 280/202 |
| 5,467,906 | A | * | 11/1995 | Forman ....................... 224/426 |
| 5,927,801 | A | * | 7/1999 | Miree ....................... 297/195.1 |
| 6,264,223 | B1 | * | 7/2001 | Loewke et al. .............. 280/202 |
| 6,435,523 | B1 | * | 8/2002 | Hilk .......................... 280/7.11 |

FOREIGN PATENT DOCUMENTS

JP 07269543 A * 10/1995

* cited by examiner

*Primary Examiner*—Sarah B McPartlin
(74) *Attorney, Agent, or Firm*—Seyfarth Shaw LLP

(57) ABSTRACT

A child carrier attachment for a bicycle has a support device and a child's seat mounted on the support device, which includes an elongate support and front and rear fasteners in the form of clamps on the support. The fasteners are adjustable into gripping engagement with a saddle post and a front post of the bicycle, respectively, to fixedly secure the carrier to the bicycle. The support device is adjustable to vary the spacing of the front and rear fasteners.

18 Claims, 9 Drawing Sheets

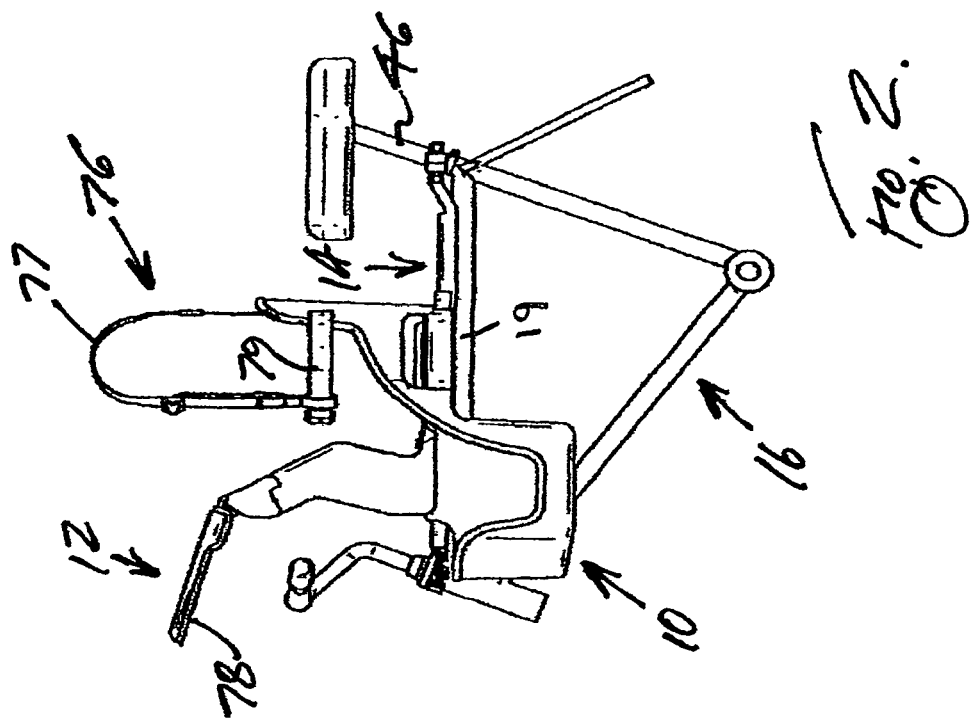
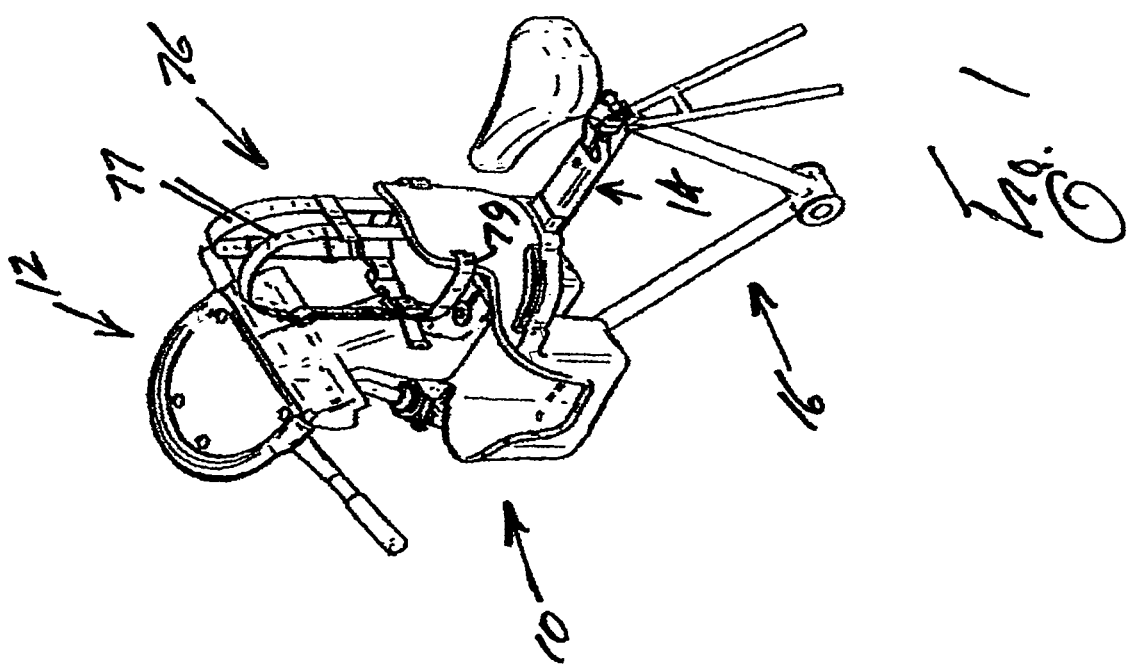

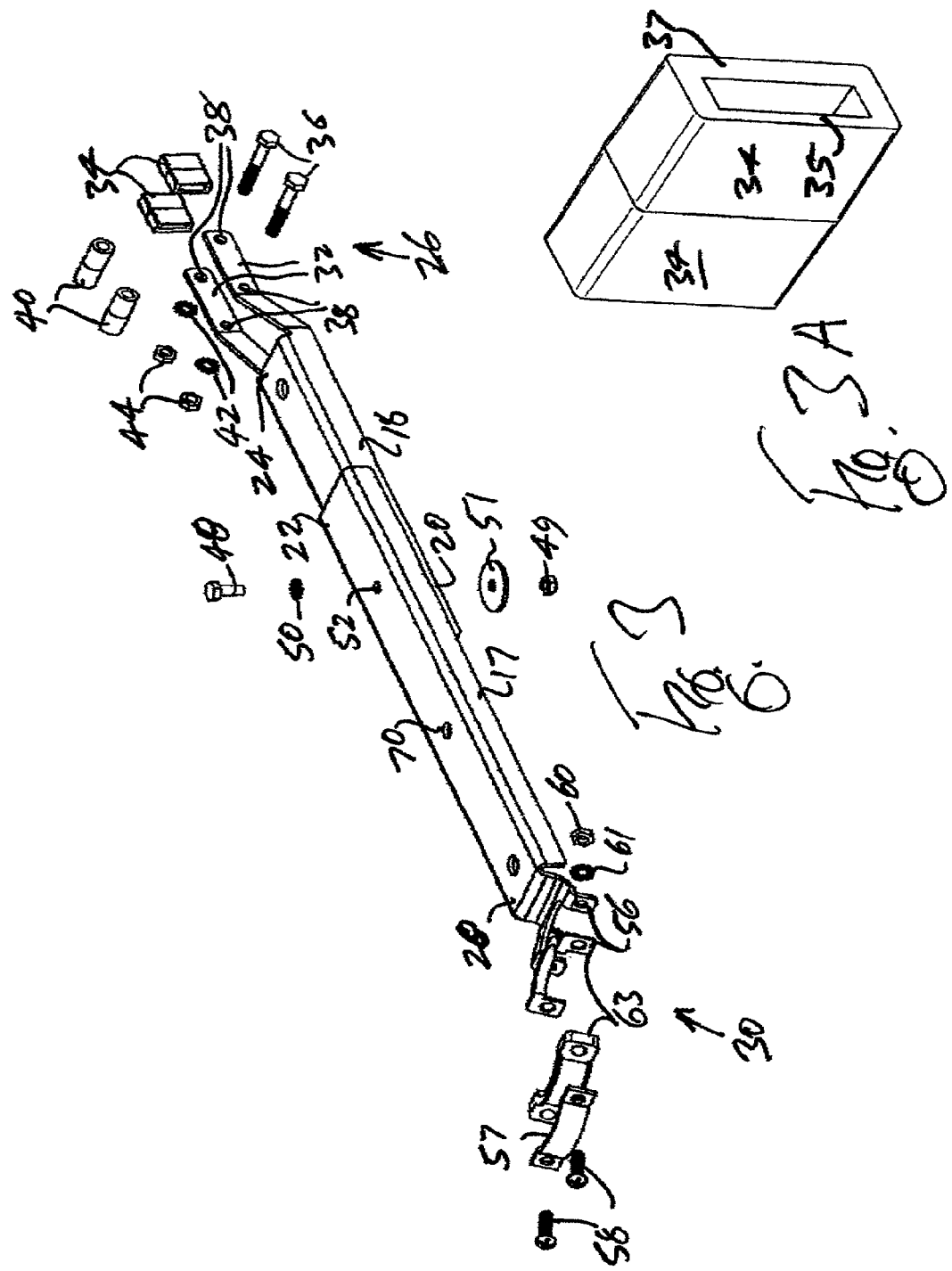

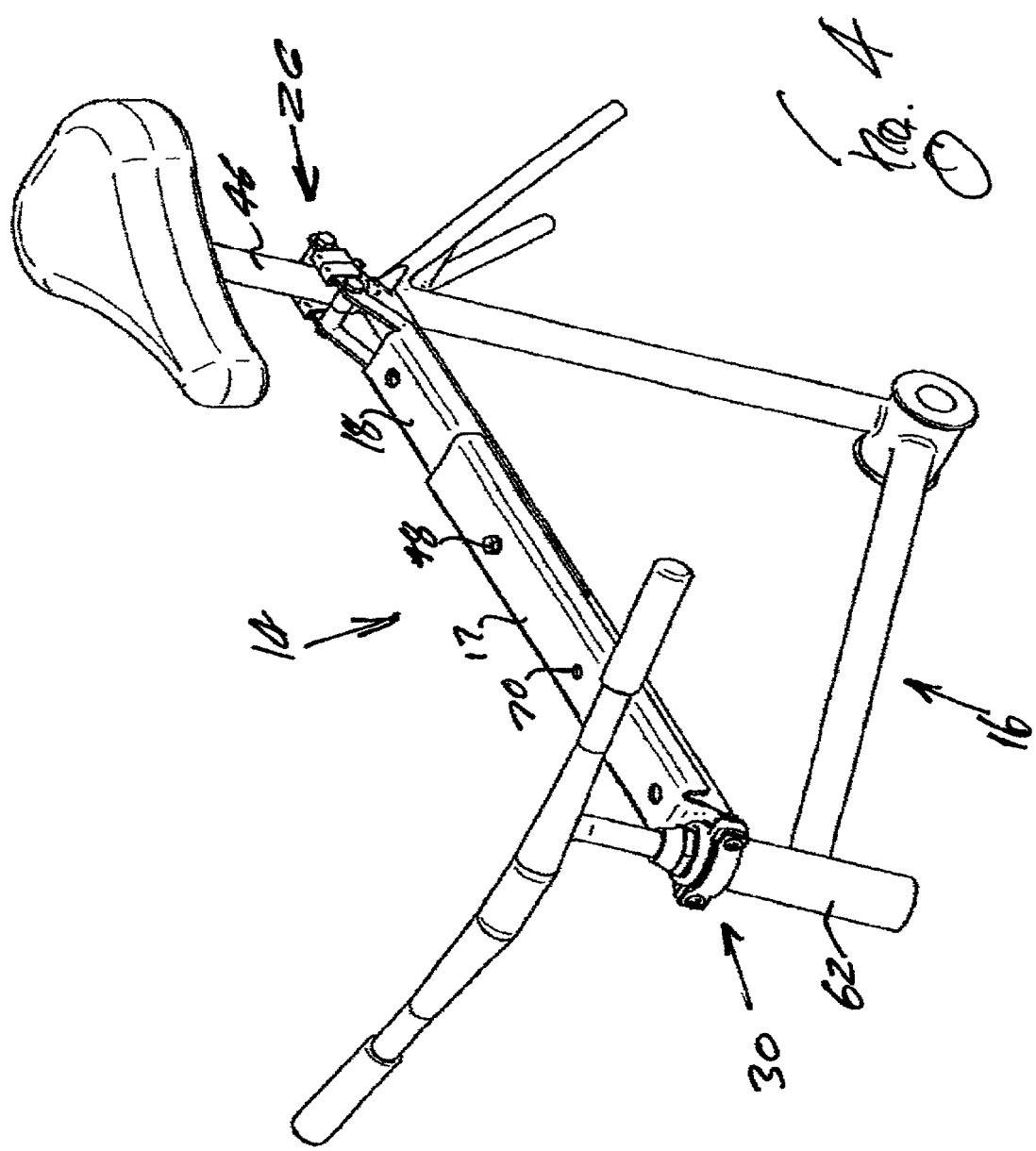

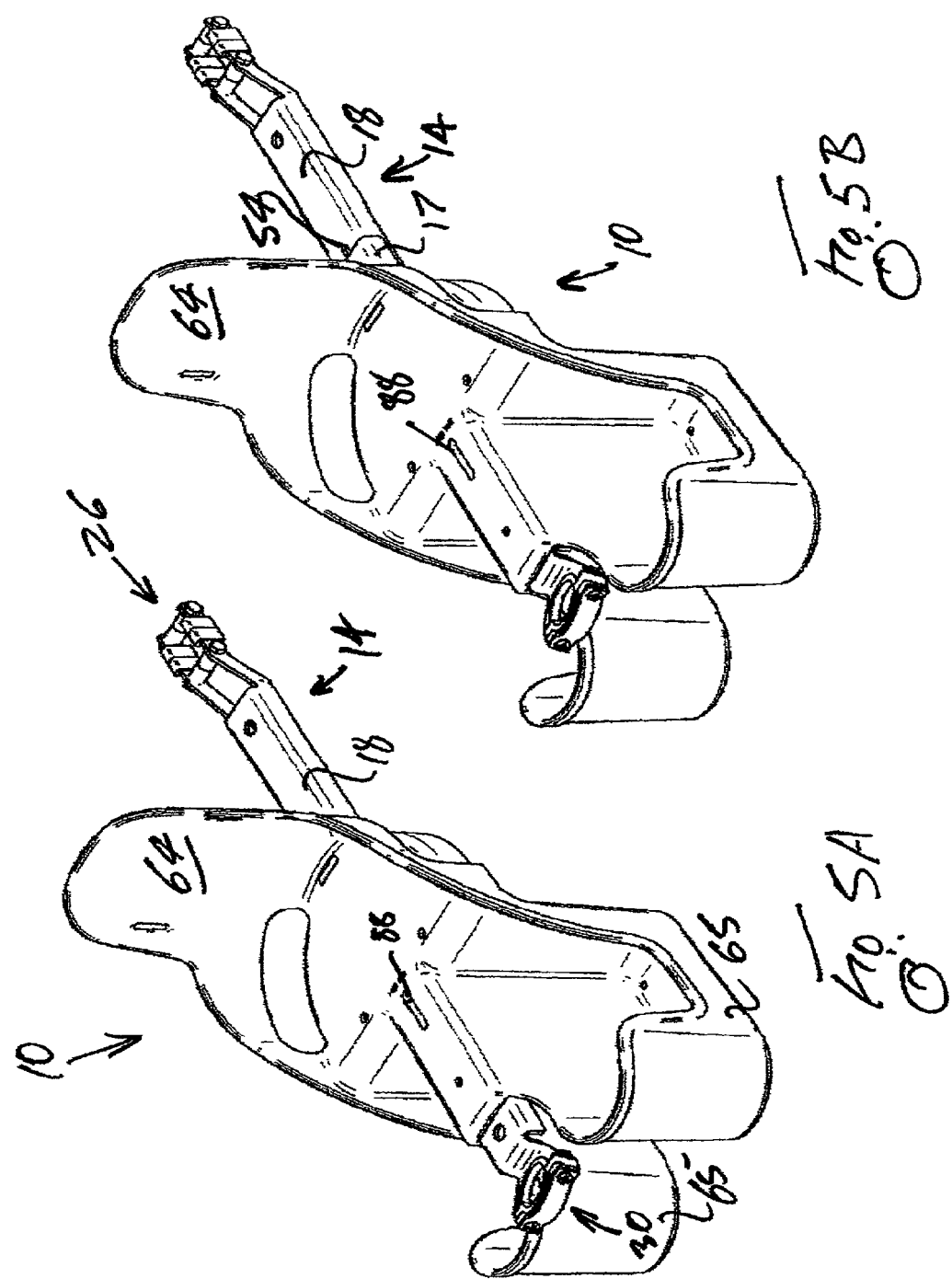

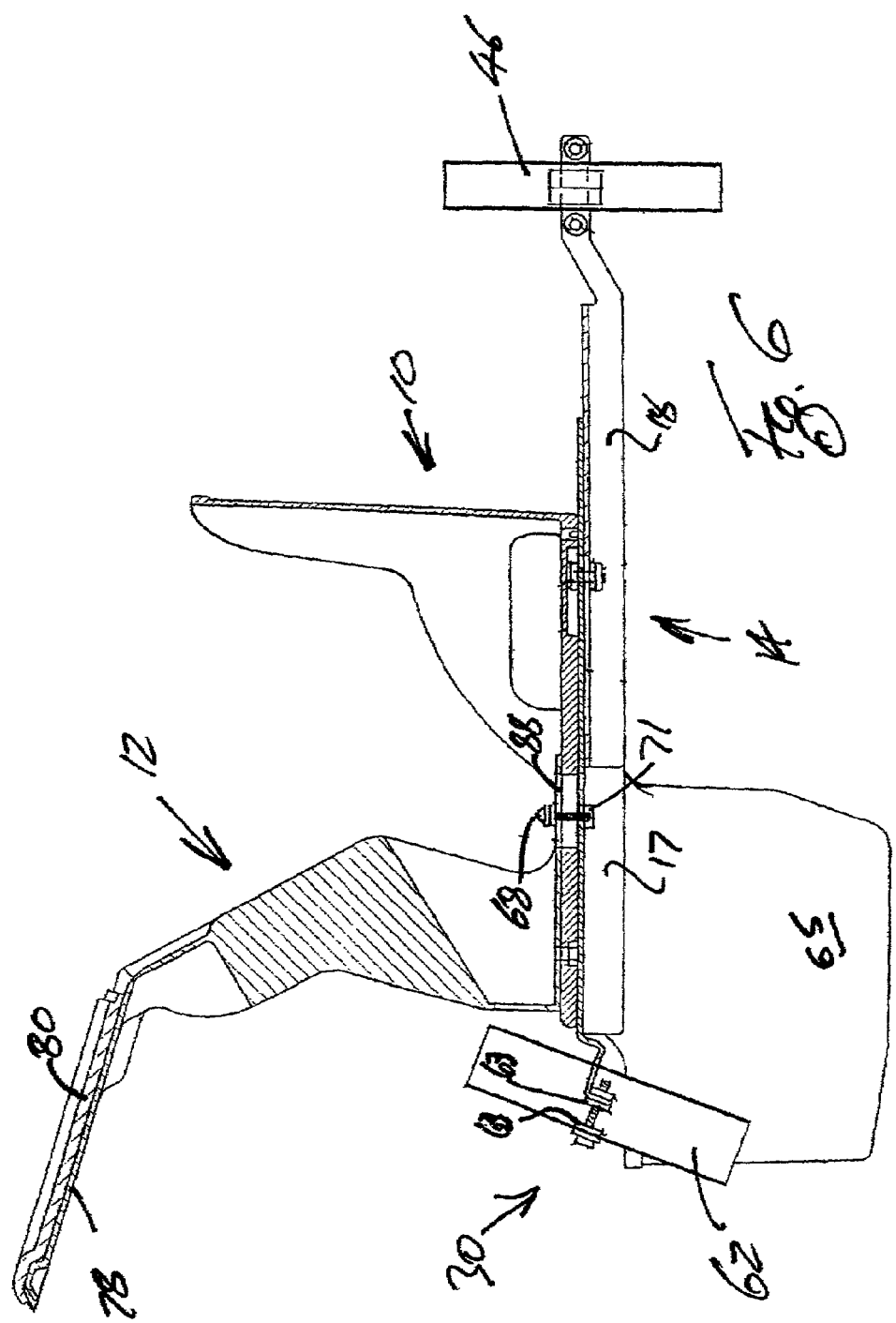

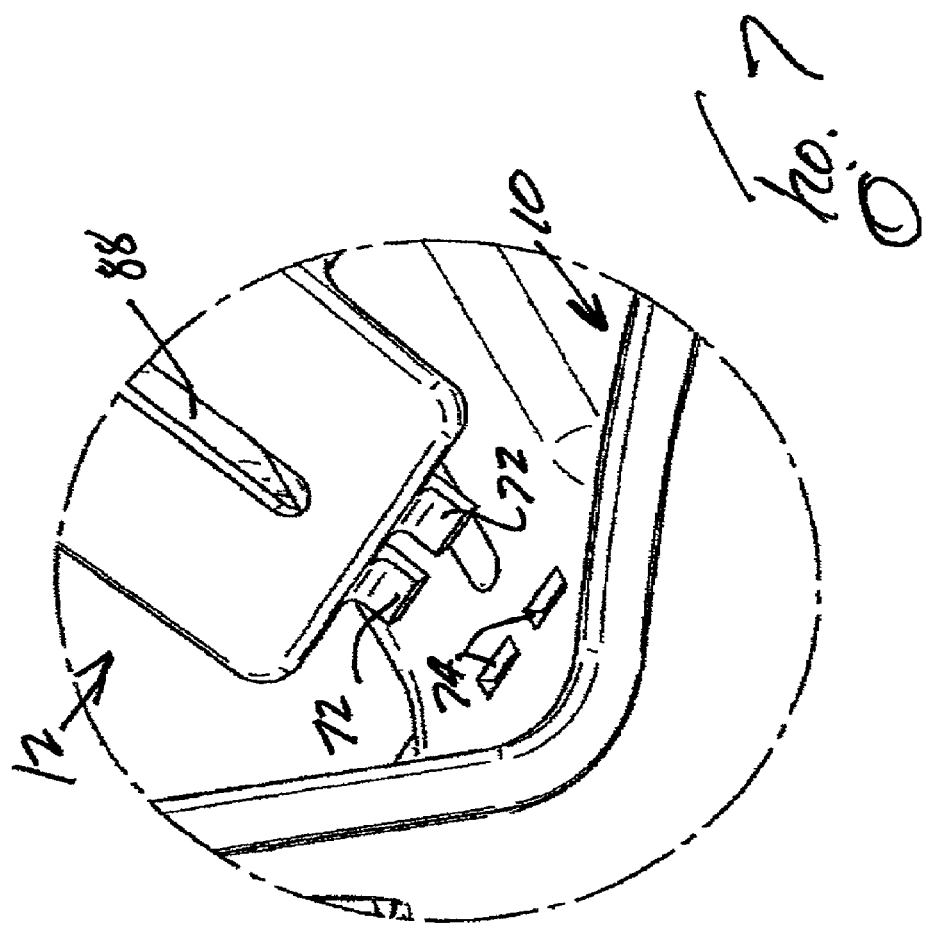

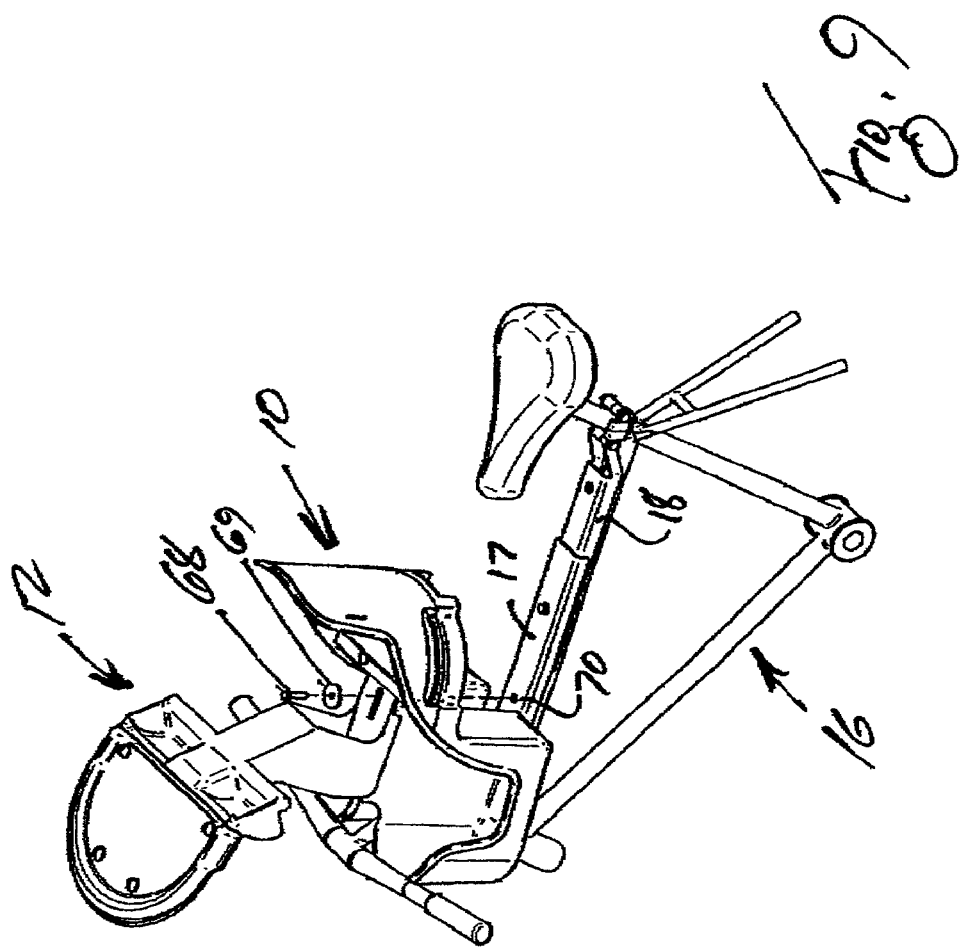

CHILD CARRIER ATTACHMENTS FOR BICYCLES

BACKGROUND OF THE INVENTION

1. Field of the Invention

The present invention relates to child carrier attachments for bicycles, and to bicycles provided with child carriers.

2. Description of the Related Art

There have, in the past, been various proposals for attaching a seat for a child to a bicycle.

Many of the prior proposals involved mounting the seat above the rear wheel of a bicycle, behind the saddle. However, such an arrangement has various disadvantages. Thus, for example, a child seated behind the saddle of a bicycle has its view largely obstructed by the rider of the bicycle, and the weight of the child over the rear wheel of the bicycle complicates the riding of the bicycle. Also, it is difficult for the rider to mount or dismount and, while riding, the rider is unable to observe the child.

The prior art also includes various proposals for mounting a child carrier between the saddle and the handle bars of the bicycle. This location of the seat has the advantages that the child can have a good view forwardly of the bicycle and is given a sense of security by being located between the arms of the rider, while the rider can observe the child.

In the present inventor's U.S. Pat. No. 5,104,188, issued Apr. 14, 1992, there is disclosed a bicycle seat for a child which, when provided on a man's bicycle, is mounted on the cross-bar of the bicycle by means of a tightener located below the seat and engaging the underside of the cross-bar. When used with a women's bicycle, which lacks a horizontal cross-bar, it is necessary to mount the seat on a separate bar, which is clamped to the steering post of the bicycle at one end of the bar, the opposite end of the bar being hingedly connected to a vertical post secured to a diagonal bracing bar forming part of the frame of the bicycle.

The present inventor has found, by practical experience, that it is desirable to be able to support the child carrier without attaching it to the horizontal cross-bar of a man's bicycle frame, because brake and derailleur cables usually extend along the horizontal cross-bar of a man's bicycle frame and, also, because the tubular components of bicycle frames vary considerably in diameter, length and angle.

In U.S. Pat. No. 4,305,532, issued Dec. 15, 1981 to John F. Reminger, there is disclosed a bicycle carrier having an elongate support which is formed, at opposite ends, with notches for receiving the front post and the saddle post of a bicycle. This carrier is intended, in particular, to be attachable to a bicycle without the use of tools, and is provided at its rear end with a slidable rear member. The slidable rear member is formed with a notch for receiving the saddle post and is intended to be slid rearwardly, relative to the support, so as to locate the saddle post in the notch in the slidable rear member when the carrier is attached to a woman's bicycle. When it is attached to a man's bicycle, the slidable rear member is removed. In that case, the support is mounted on the cross-bar of the man's bicycle, with projections on the underside of the support engaging the cross-bar, and with the notches in the opposite ends of the support slid into engagement with the front post and the saddle post of the bicycle.

The carrier disclosed in the aforesaid U.S. Pat. No. 4,305,532 is particularly intended to be installed on and removed from a bicycle without the use of tool. When it is being installed onto a man's bicycle, therefore, it is simply pushed into position, and must therefore be of a predetermined length to fit a predetermined bicycle frame size. The notches at opposite ends of the carrier are of fixed width and are not adjustable to fit tubular bicycle components of various sizes. This prior art carrier is therefore not adjustable to fit bicycles of different sizes.

It would be apparent that in either case, the support is only loosely secured to the bicycle frame, and consequently there is a risk that it may easily be displaced from the frame when the bicycle it is for example subjected to an impact or a more or less violent movement by the child while in motion or when the rider of the bicycle is mounting or dismounting from the bicycle or when the rider is installing the child in, or removing the child from, the carrier. In connection with the latter, it will be appreciated that the rider must somehow support the bicycle while lifting a child into or from the carrier. This is often an awkward manoeuver, accomplished by leaning the bicycle against the riders body. The child will often wriggle while being lifted. It is therefore very important that the carrier should be fixedly connected to the bicycle instead of being only loosely attached.

BRIEF SUMMARY OF THE INVENTION

It is accordingly an object of the present invention to provide a novel and improved child carrier attachment for a bicycle which is readily adaptable to different bicycle frame sizes and which avoids any necessity for clamping onto the horizontal cross-bars of men's bicycle frames, but which is also fixedly attachable to the bicycle.

According to the present invention, a child carrier attachment for a bicycle comprises a support device and a child seat mountable on the support device, the support device comprising an elongate support, and front and rear clamping devices on the elongate support, the rear fastener being adjustable into gripping engagement with a saddle post of the bicycle, the front fastener being adjustable into gripping engagement with a front post of the bicycle, and the support device being adjustable to vary the spacing of the front and rear fasteners. The support defines a longitudinally extending channel. The channel is positionable above and facing a top tube of the bicycle when the bicycle is a male-style bicycle.

With this attachment the support device can be adapted to different frame sizes by varying the spacing of the front and rear fasteners. Also, since the front and rear fasteners are engagable with the front post and the saddle post, respectively, of the bicycle, any brake and derailleur cables extending along the bicycle frame are not damaged by securement of the child carrier attachment to the bicycle and do not obstruct the securement of the child carrier attachment to the bicycle.

By means of the front and rear clamping devices, the support is fixedly connectable to the bicycle and therefore cannot be dislodged by toppling of the bicycle or by movement of the bicycle and or of a child as the child is lifted into or from the carrier.

BRIEF DESCRIPTION OF THE DRAWINGS

The invention will be more readily understood from the following description of a preferred embodiment thereof given, by way of example, with reference to the accompanying drawings, in which:

FIG. 1 shows a view in perspective of a child carrier attachment embodying the present invention mounted on parts of a bicycle;

FIG. 2 shows a view in side elevation of the child carrier attachment of FIG. 1;

FIG. 3 shows an exploded view, in perspective, of components of a support device forming part of the child carrier attachment of FIGS. 1 and 2;

FIG. 3A shows a view in perspective of a pair of spacers forming parts of a rear clamp shown in FIG. 3;

FIG. 4 shows parts of the bicycle of FIG. 1 with the support device of FIG. 3 secured to it, but with other components of the child carrier attachment omitted;

FIGS. 5A and 5B show views in perspective of a seat mounted in different positions on the support device of FIG. 3;

FIG. 6 shows a view in vertical longitudinal cross-section through the child carrier attachment of FIG. 1;

FIG. 7 shows an enlarged portion of FIG. 6 to illustrate interengagement of the headrest attachment and the seat;

FIG. 8 shows a view in perspective of the seat mounted on the support device and the headrest attachment mounted on the seat;

DESCRIPTION OF THE PREFERRED EMBODIMENT

Figure 9:
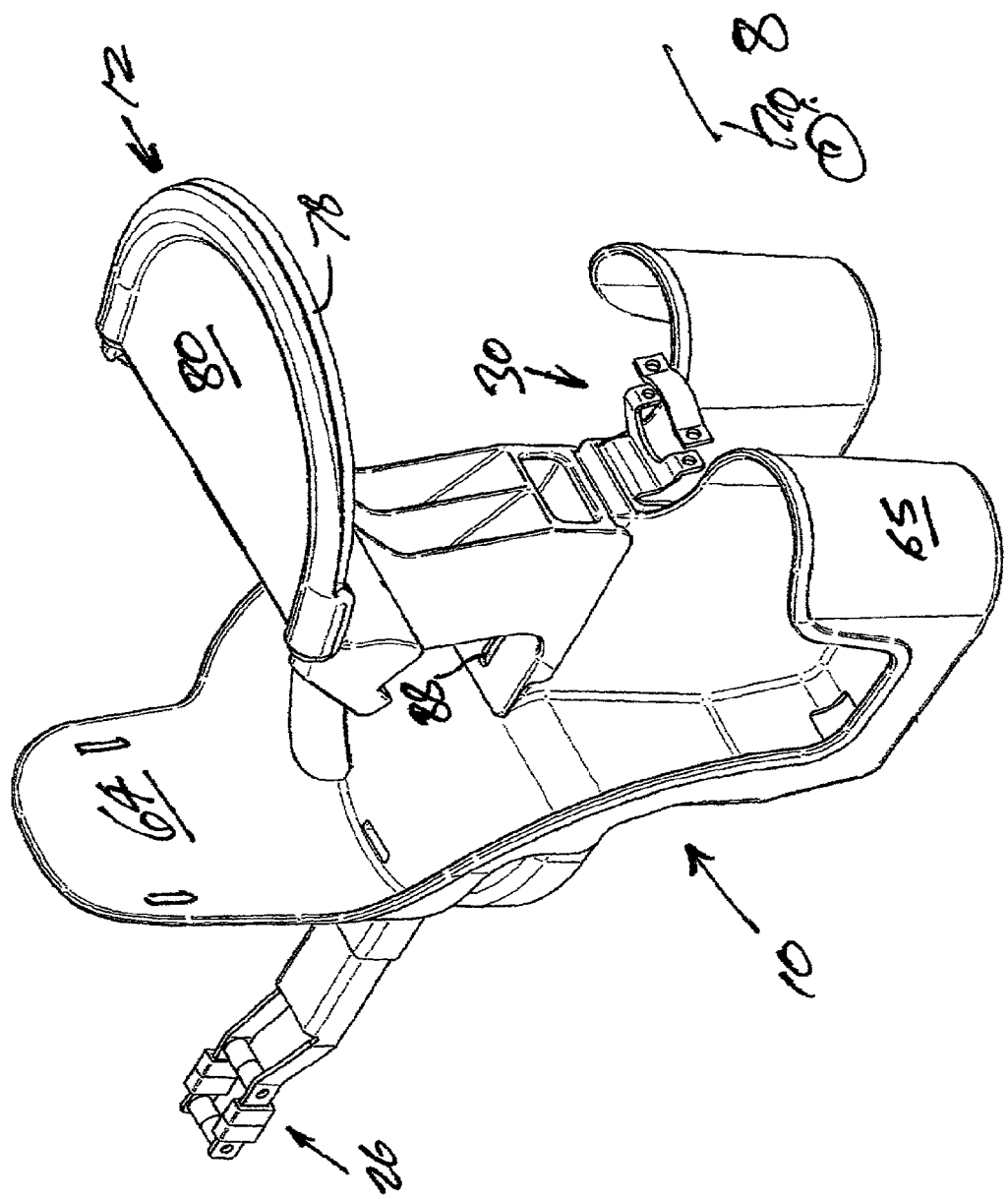
FIG. 9 shows a view in perspective of the seat and the headrest attachment being being mounted on the support device on a bicycle frame.

FIGS. 1 and 2 of the accompanying drawings show a child carrier attachment comprising a child's seat, indicated generally by reference numeral 10, a headrest indicated generally by reference numeral 12, and a support device indicated generally by reference numeral 14. The support device 14 is, in turn, mounted on a bicycle frame a part of which is indicated generally by reference numeral 16. The bicycle frame is male-style because there is top tube 19.

The support device 14 is shown in greater detail in FIG. 3 and comprises an elongate support formed by front and rear support bars 17 and 18 in the form of steel channel members having inverted U-shaped cross-sections. The channels of these members are positioned above and facing the top 19 of the bicycle frame.

The rear support bar 18 has a front end 20 which is slidable within a rear end 22 of the front support bar 17, and is provided at its rear end 24 with a rear or saddle post clamping device indicated generally by reference numeral 26, while the front support bar 17 is provided, at its front end 28, with a front or steering post clamping device indicated generally by reference numeral 30.

More particularly, the rear end 24 of the rear support bar 18 is formed with two rearwardly projecting strip-shaped arms 32, onto each of which fit a pair of resilient spacers 34 which are of hollow rectangular cross-section. As shown in FIG. 3A, the spacers 34 have opposite walls 35 and 37, which have different thicknesses.

A pair of threaded members in the form of bolts 36 extend through holes 38 in the arms 32, through resiliently compressible cylindrical sleeves 40 positioned between the arms 32 and through washers 42 into threaded engagement with retainers in the form of nuts 44. The bolts 36 can be tightened to bring the rear clamp 26 into gripping engagement with a saddle post 46 (FIG. 2) installed in a gap between the spacers 34 on the arms 32. By repositioning the spacers 34 on the arms 32 to position the thicker or thinner walls of the spacers 34 adjacent the saddle post 46, or by omitting the spacers 34, the width of this gap can be adapted to the diameter and the inclination of the saddle post 46.

The front support bar 17 is adjustably secured to the rear support bar 18 by means of a fastener comprising a hexagonal bolt 48, a hexagonal nut 49, an external tooth washer 50 and a fender washer 51, the bolt 48 extending through a circular hole 52 in the front support bar 17 and through a longitudinal slot 54 in the rear support bar 18. With this arrangement, the support device 14 is adjustable, by relative longitudinal sliding of the front and rear support bars 17 and 18, to vary the spacing between the front and rear clamps 30 and 26.

The front clamp 30 comprises a forwardly open yoke 56 formed on the front end 28 of the front support bar 17 and a U-clamp bracket 57, opposite ends of which are secured to the arms of the yoke 56 by fasteners comprising screws 58 and nuts 60, provided with external tooth washers 61. Curved spacer members or collars 63 of resilient material are provided between the bracket 57 and the yoke 56 for gripping engagement with a head tube or steering post 62 forming part of the bicycle frame, and the thickness of these collars 63 may be selected to suit the diameter of the post 62 so as to ensure a tight fit. As can be seen in FIG. 6, the front clamp 30 is angled, relative to the support bar 17, to suit the inclination of the steering post 62. This permits full surface contact between the collars 63 and the steering post 62, thus providing a high clamping force and counteracting any risk of the support bar being deformed, dislodged or rotated under reasonable impact forces.

FIG. 4 shows the support device 14 mounted on the bicycle frame 16, with the rear fastener 26 in gripping engagement with the saddle post 46 and with the front fastener in gripping engagement with the front or steering post 62 of the bicycle frame 16.

With the support device 14 thus secured to the bicycle frame 16, the bicycle can be ridden without the seat 10 and the headrest attachment 12.

FIGS. 5A and 5B show the seat 10 mounted on, but not yet secured to, the support device 14. The seat 10 is formed as a molding with a seat back 64 and with a pair of upwardly and laterally outwardly open foot boxes or foot rests 65 for receiving the feet and legs of a child on the seat to protect them. As shown, the foot rests 65 straddle the support device 14. The width of the seat 10 is preferably limited to e.g. nine inches in order to avoid interference with the rider's legs.

The seat 10 is formed with a slot 88 (FIGS. 5A and 5B) for receiving a bolt 68, which extends through a washer 69 (FIG. 9) and an opening 70 in the front support bar 17 into threaded engagement with a self-clinching fastener 71 (FIG. 6). The fastener 71, which is manufactured and sold under the trade name PEM by Penn Engineering and Manufacturing Corp., is inserted into a hole in the front support bar 17 and then compressed, in known manner, into locking engagement with the front support bar 17. By these means, the seat 10 is longitudinally adjustably secured to the support device 14 so as to be movable between a rearward position, relative to the front support bar, in which the seat is shown in FIG. 5A with the support device 14 fully extended, and a forward position, relative to the front support bar, as shown in FIG. 5B, which also shows the support device 14 fully extended.

FIG. 7 shows the headrest attachment 12 during its assembly on the seat 10. As can be seen in FIG. 7, the headrest attachment 12 is formed with a pair of projecting tongues 72 which are engagable in slots 74 in the seat 10, and also with a longitudinal slot.

FIG. 8 shows the headrest attachment 12 mounted on the seat 10 which, in turn, is mounted in the support device 14, and FIG. 9 further shows these components in relation to the bicycle frame 16.

FIGS. 1 and 2 also illustrate a safety harness, indicated by reference numeral 76, which is secured to the seat 10. This safety harness 76 has been omitted from the other figures to facilitate illustration of the child carrier attachment.

The safety harness 76 has a pair of shoulder straps 77 and a waist strap 79. The waist strap 79 passes from within the seat 10 rearwardly through a pair of slots in the seat back 64 and then forwardly around the exterior of the seat back 64 through loops in the lower ends of the shoulder straps 77 to a waist buckle. This arrangement of the safety harness has been found to be particularly suitable for allowing the child sufficient slack to move comfortably and to rest on the headrest attachment 12 while also preventing the child from falling to the side of the seat 10, and from standing or moving its body sideways sufficiently to adversely affect the balance and stability and control of the bicycle.

The headrest attachment 12 comprises a forwardly and upwardly inclined tray 78, on which a resilient pad 80 is retained by means of snap fasteners (not shown) to allow the child to rest its head on the headrest attachment 12.

Figure 10:
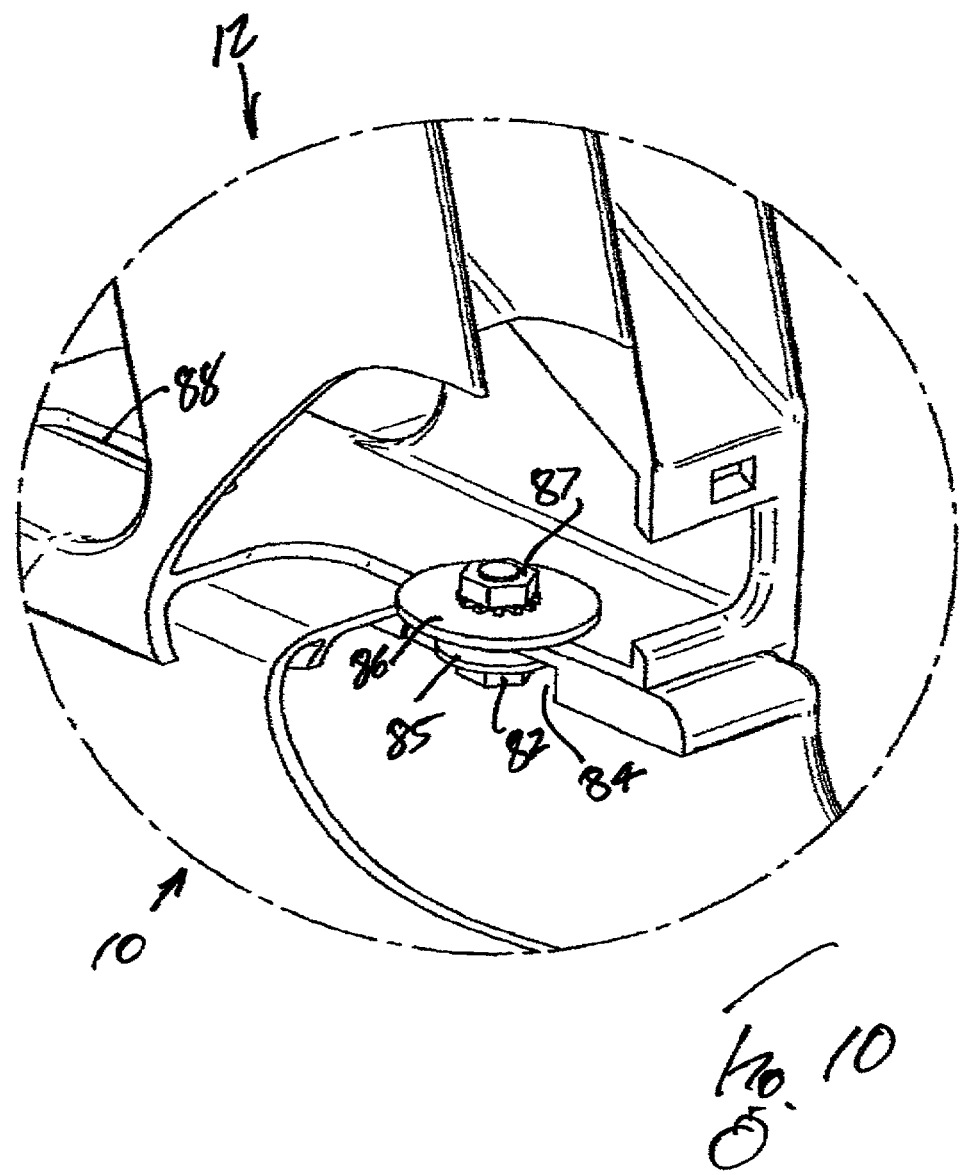
FIG. 10 shows a broken-away view, in perspective, of parts of the headrest attachment and the seat secured together by a fastener.

As shown in FIG. 10, the headrest attachment 12 is secured to the seat 10 by a bolt 82, the head of which is received in a recess 84 (FIG. 6) in the underside of the seat 10, washers 85 and 86 and a nut 87, and has a slot 88 which receives the bolt 68 so as to allow the headrest attachment 12 to be displaced together with the seat 10 when the latter is adjusted in position along the front support bar 17 as described above.

With the above-described invention, the support device 14 and the seat 10 with its headrest 12 are fixedly secured to the bicycle frame 16 and cannot be dislodged, even if the bicycle falls sideways to the ground. Since the child occupying the seat 10 is restrained by the harness 76, the child is thus securely held in position on the bicycle. If required, the bicycle can be ridden with the seat 10 and headrest 12 removed, in which case the support device 14 remains fixed in position on the bicycle frame 16.

The front and rear clamping devices 30 and 26 enable the support device 14 to be readily attached to a wide variety of bicycle frame tube diameters and the longitudinal adjustability of the support device 14 enables it to be attached to a wide variety of bicycle frame types and sizes. The present child carrier attachment can therefore be readily and securely mounted on a wide variety of men's and women's bicycles without interfering with brake and derailleur cables on the bicycle frames.

By positioning the child carrier in front of the parent and behind the handlebars, the above-described attachment permits an interactive ride of the parent with the child with the objective of increasing the educational opportunities for the child and increasing the "bonding" between the parent and the child. The carrier is positioned such that the parent can readily observe the physical condition of the child and constantly monitor its changing needs. The child can be readily placed in or removed from the carrier with minimal risk of causing the bicycle to topple and the rider can readily mount or dismount from the bicycle with minimal risk of destabilizing the bicycle and causing the bicycle and its attached carrier to topple. The head support can support a resting child while the child is being transported in the child carrier and permits the adult rider to monitor the resting child and readily respond to the child's requirements. The child carrier is positioned so to minimize the effects of t/he child's weight or movement on the balance and stability/control of the bicycle. The child carrier can be easily and securely attached to its bicycle and readily transferred from bicycle to bicycle. The carrier attachment is applicable to the majority of adult leisure and recreational bicycles and does not interfere with the operation of brake and/or gear cables which may be on the bicycle. The secure attachment permits the child carrier to sustain a reasonable impact from any direction without causing the child carrier to be dislodged from its point(s) of attachment or causing the child carrier to rotate about any axis passing through the point(s) of attachment.

As will be apparent to those skilled in the art, various modifications may be made to the above-described embodiment within the scope of the appended claims.

For example, instead of the longitudinally extensible and contractable elongate support of the above-described embodiment, it would alternatively be possible to employ an elongate non-extensible support bar, in one piece, with the front and rear fasteners adjustable in position on this support bar, either with the front and rear fasteners in longitudinal alignment with the support bar or with the support bar offset laterally relative to the front and rear fasteners.

What is claimed is:

1. A child carrier attachment for a bicycle, comprising a support device and a child's seat mounted on said support device, said supper device comprising:
   an elongate support comprising a rear support bar and a front support bar, the elongate support having an overall length and defining a longitudinally extending channel, wherein said longitudinally extending channel is generally u-shaped extending the length of the elongate support and is adapted to mate with a top tube of said bicycle when said bicycle is a male style bicycle;
   a rear fastener on said rear support bar, said rear fastener comprising a rear clamping device which is adjustable into gripping engagement with a saddle post of the bicycle to secure said support device to said saddle post; and
   a front fastener on said front support bar, said front fastener comprising a front clamping device which is adjustable into gripping engagement with a steering post of said bicycle,
   said front and rear support bars being adjustable relative to one another to vary the spacing of said front and rear clamping devices and adjust the overall length between an extended position and a retracted position.

2. A child carrier attachment as claimed in claim 1, wherein said rear clamping device, includes at least one spacer member having at least two walls of different thickness, one of said walls only to be selected from said two walls for contact with said saddle post.

3. A child carrier attachment as claimed in claim 2, wherein said elongate support comprises a pair of elongate support members which are mutually longitudinally adjustable.

4. A child carrier attachment as claimed in claim 2, wherein said rear clamping device is adjustable to fit posts of various diameters, and said rear clamping device further comprises a pair of rearwardly projecting arms and another spacer member, said spacer members being fitted on said arms and spaced apart by a gap to receive the saddle post therebetween and the size of said gap is different depending upon which of said two walls is selected.

5. A child carrier attachment as claimed in claim 4, wherein said spacer member has at least two walls of different thickness, one of said walls only to be selected from said two walls of said another spacer member for contact with said saddle post.

6. A child carrier attachment as claimed in claim 5, wherein said rear clamping device includes a pair of threaded retainers and a pair of threaded members extending through said arms into threaded engagement with said threaded retainers for tightening said arms together.

7. A child carrier attachment as claimed in claim 6, further comprising resilient longitudinally compressible sleeves on said threaded members between said arms.

8. A child carrier attachment as claimed in claim 5, wherein said spacer members are of a hollow rectangular cross-section.

9. A child carrier attachment as claimed in claim 1, wherein said front clamping device comprises a forwardly open yoke having arms and a curved clamp bracket having opposite ends, fasteners securing said opposite ends to the arms of said yoke and at least one curved spacer member located between said bracket and said yoke.

10. A child carrier attachment as claimed in claim 1, wherein said seat has foot rests which straddle said elongate support.

11. A child carrier attachment for a bicycle comprising:
an elongate support comprising a rear support bar and a front support bar and defining an overall length, the elongate support defining a longitudinally extending channel, wherein said longitudinally extending channel is generally u-shaped extending the length of the elongate support and is adapted to mate with a top tube of said bicycle when said bicycle is a male style bicycle; the overall length being adjustable between an extended position and a retracted position by relative movement of the front and rear support bars;
a rear fastener on said rear support bar, said rear fastener comprising a saddle post clamp, said saddle post clamp having means for adjusting said saddle post clamp for gripping engagement with saddle posts of various diameters;
a front fastener on said front support bar, said front fastener comprising a steering post clamp and said steering post clamp including means for adjusting said steering post clamp for gripping engagement with bicycle steering posts of various diameters; and
a child's seat including foot rests integral to said child's seat, said child's seat mounted on said support, said foot rests swaddling said support,
said front and rear support bars being adjustable to vary the spacing of said front and rear fasteners.

12. A child carrier attachment as claimed in claim 11, wherein said seat is adjustable in position along said support and including a releasable seat fastener securing said seat in position along said support.

13. A child carrier attachment as claimed in claim 11, including a headrest attachment on said seat, said headrest attachment and said seat having mutually interengageable portions.

14. A child carrier attachment as claimed in claim 13, wherein said seat is adjustable in position along said support, said child carrier attachment including a releasable seat fastener securing said seat in position along said support, and wherein said headrest attachment is secured to said seat so as to be displaceable with said seat relative to said support device.

15. A child carrier attachment as claimed in claim 11, wherein said saddle post clamp adjusting means includes at least one spacer member having at least two walls of different thickness, one of said walls only to be selected from said two walls for contact with said saddle post.

16. A child carrier attachment as claimed in claim 15, wherein said saddle post clamp adjusting means further comprises another spacer member having at least two walls of different thickness, one of said walls only to be selected from said walls of said another spacer member for contact with said saddle post.

17. A child carrier attachment for a bicycle, comprising a support device and a child's seat mounted on said support device, said support device comprising:
an elongate support comprising a rear support bar and a front support bar, the elongate support having an overall length, wherein a generally u-shaped longitudinally extending channel extends the length of the elongate support and is adapted to mate with a top tube of said bicycle is a male style bicycle;
a rear fastener on said rear support bar, said rear fastener comprising a rear clamping device which is adjustable into gripping engagement with a saddle post of the bicycle to secure said support device to said saddle post; and
a front fastener on said front support bar, said front fastener comprising a forwardly open yoke having arms and a caved clamp bracket having opposite ends, said front fastener also adjustable into gripping engagement with a steering post of the bicycle, said front fastener further comprising fasteners securing said opposite ends to the arms of said yoke and at least one curved spacer member located between said bracket and said yoke,
said front and rear support bars being adjustable to vary the spacing of said front and rear fasteners and the overall length between an extended position and a retracted position.

18. A child carrier attachment as claimed in claim 17, wherein said support defines a longitudinally extending channel, said channel positionable above and facing a top tube of said bicycle when said bicycle is a male-style bicycle.

* * * * *

UNITED STATES PATENT AND TRADEMARK OFFICE
CERTIFICATE OF CORRECTION

PATENT NO.         : 7,523,986 B2
APPLICATION NO.    : 09/804070
DATED              : April 28, 2009
INVENTOR(S)        : Malcolm Jefferson et al.

It is certified that error appears in the above-identified patent and that said Letters Patent is hereby corrected as shown below:

<u>Column 6</u> line 17 "supper" should be "support".

<u>Column 8</u>

Line 33 "caved" should be "curved".

Signed and Sealed this

Ninth Day of June, 2009

JOHN DOLL
*Acting Director of the United States Patent and Trademark Office*